US008676825B2

(12) United States Patent
Rao

(10) Patent No.: US 8,676,825 B2
(45) Date of Patent: Mar. 18, 2014

(54) SYSTEMS AND METHODS FOR EXTRACTING BUSINESS PROCESS METRICS FROM A UML MODEL

(75) Inventor: Santosh Kumar Rao, Mangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/425,932

(22) Filed: Mar. 21, 2012

(65) Prior Publication Data
US 2013/0166584 A1 Jun. 27, 2013

(30) Foreign Application Priority Data

Dec. 22, 2011 (IN) ............................ 4522/CHE/2011

(51) Int. Cl.
*G06F 7/00* (2006.01)
*G06F 17/30* (2006.01)
*G06Q 10/06* (2012.01)

(52) U.S. Cl.
CPC ................................ *G06Q 10/06393* (2013.01)
USPC ...................................................... 707/759

(58) Field of Classification Search
None
See application file for complete search history.

(56) References Cited

U.S. PATENT DOCUMENTS

2009/0006146 A1* 1/2009 Chowdhary et al. .............. 705/7

OTHER PUBLICATIONS

Stefanov, Veronika. Conceptual Models and Model-Based Business Metadata to Bridge the Gap between Data Warehouses and Organizations. Diss. PhD Thesis, 2007.*
Spanoudakis, George, and Andrea Zisman. "Discovering services during service-based system design using UML." Software Engineering, IEEE Transactions on 36, No. 3 (May/Jun. 2010): 371-389.*
OMG Trademarks, http://www.omg.org/legal/tm_list.htm, pdf generated Jun. 26, 2013.*

* cited by examiner

*Primary Examiner* — Jay Morrison
(74) *Attorney, Agent, or Firm* — Marc S. Kaufman; Stephen M. Hertzler; Reed Smith LLP

(57) ABSTRACT

The invention relates to a system and method for extracting business process metrics from a Unified Modeling Language (UML) model. This invention involves the use of Object Constraint Language (OCL) and custom stereotypes to extract the design metrics from a UML model. The business process parameters to be measured are defined and custom stereotypes for each design element present in the business process parameters are also defined. A UML diagram is generated to represent the steps required to complete the business process. The UML diagrams are based on UML 2.0 or its higher version. The queries are written in OCL and run on the activity or sequence diagram to extract the desired metrics.

20 Claims, 4 Drawing Sheets

US 8,676,825 B2

SYSTEMS AND METHODS FOR EXTRACTING BUSINESS PROCESS METRICS FROM A UML MODEL

RELATED APPLICATION DATA

This application claims priority to Indian Patent Application No. 4522/CHE/2011, filed Dec. 22, 2011, which is hereby incorporated by reference in its entirety.

FIELD OF THE INVENTION

The present invention relates to the extraction of business process metrics from an Unified Modeling Language (UML) model, and in particular, to systems and methods for extracting business process metrics from a UML 2.0 model by using Object Constraint Language (OCL) as a query language and custom stereotypes.

BACKGROUND

Unified Modeling Language (UML) is the most common and popular means of expressing a piece of software code, flow, process, activity or a system in the software world. With UML 2.0, Model Driven Architecture (MDA) and supporting languages such as Object Constraint language (OCL) and Query View Transformation (QTV) are in place now. It has provided a complete different paradigm on how models can be used to speak and provide information that architects and customers expect from the system. The MDA talks of using OCL as a query language.

Although UML is used to express software code, flow, process, activity, there is no technology that helps designer or architect to capture design metrics from UML model using custom stereotypes. It is helpful for architects to assess the system architecture and performance before the development team builds a proof of concept or a system. Further, it can help identify the customer experience metrics for an existing or new system that is laid out in UML 2.0 or its higher standards using custom stereotypes to meet the organization's needs. In addition to that, it can reduce the rework by identifying the bottlenecks of the program and an issue at the design phase and helps to assess design against a custom organization defined standard.

In view of the foregoing discussion, there is a need for extracting business process metrics from a UML model to help a designer to assess the system architecture and performance at the design phase.

SUMMARY

The present invention helps to extract business process metrics from a UML model using OCL and custom stereotypes. According to the present embodiment, a method for extracting at least one business process metric from a UML model is disclosed. The method includes defining one or more measurable parameters present in a business process. Thereafter, one or more UML diagram including a plurality of steps is generated based on an UML 2.0. According to an embodiment of the present invention the UML diagram includes activity diagram and sequence diagram. After that, one or more custom stereotypes are defined for each design element present in the one or more measurable parameters. The method further includes generating one or more queries based on the one or more custom stereotypes. In accordance with an embodiment of the present invention, the language of the one or more queries is based on OCL. Thereafter, the one or more queries are run on the one or more UML diagrams to extract at least one metric of the business process.

In an additional embodiment, a system for extracting at least one business process metrics from a UML model is disclosed. As disclosed, the embodiment includes a parameter definition module, a UML diagram generation module, a custom stereotypes definition module, a query generation module and a metrics extraction module. The parameter definition module is configured to define one or more measurable parameters of a business process. The UML diagram generation module is configured to generate one or more UML based activity or sequence diagrams representing a plurality of steps to complete the business process. According to an embodiment of the present invention, the one or more UML diagrams are based on UML 2.0. The custom stereotypes definition module is configured to define one or more custom stereotypes for one or more design elements present in the one or more measurable parameters of the business process. The query generation module is configured to generate one or more queries based on the one or more custom stereotypes. According to an embodiment of the present invention, the one or more queries are based on OCL. The metrics extraction module is configured to extract at least one metrics of the business process by running the one or more queries on the one or more UML diagrams.

In another embodiment, a computer program product for extracting at least one business process metrics from a UML model is disclosed. The computer program product includes a computer usable medium having a computer readable program code embodied therein for extracting at least one business process metric from a UML model. The computer readable program code storing a set of instructions configured for defining one or more measurable parameters of a business process; representing a plurality of steps to complete the business process in one or more UML diagrams, wherein the one or more UML diagrams are based on UML2.0; defining one or more custom stereotypes for one or more design elements present in the one or more measurable parameters of the business process; generating one or more queries based on the one or more custom stereotypes, wherein the one or more queries are specified in OCL and running the one or more queries on the UML diagram to extract the at least one metric of the business process.

DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present disclosure provide a system and method for extracting at least one business process metrics from a UML model, where one or more measurable parameters of a business process are defined. A UML diagram is generated to represent one or more steps to be performed to complete the business process. One or more custom stereotypes are defined for each design element present in the one or more measurable parameters of the business process. Thereafter, one or more queries are generated based on the business requirements in Object Constraint Language (OCL). Subsequently, the one or more queries are run on the UML diagram to extract the metrics from the UML model by using a tool that supports UML 2.0 or its higher versions, OCL and custom stereotypes.

Figure 1:
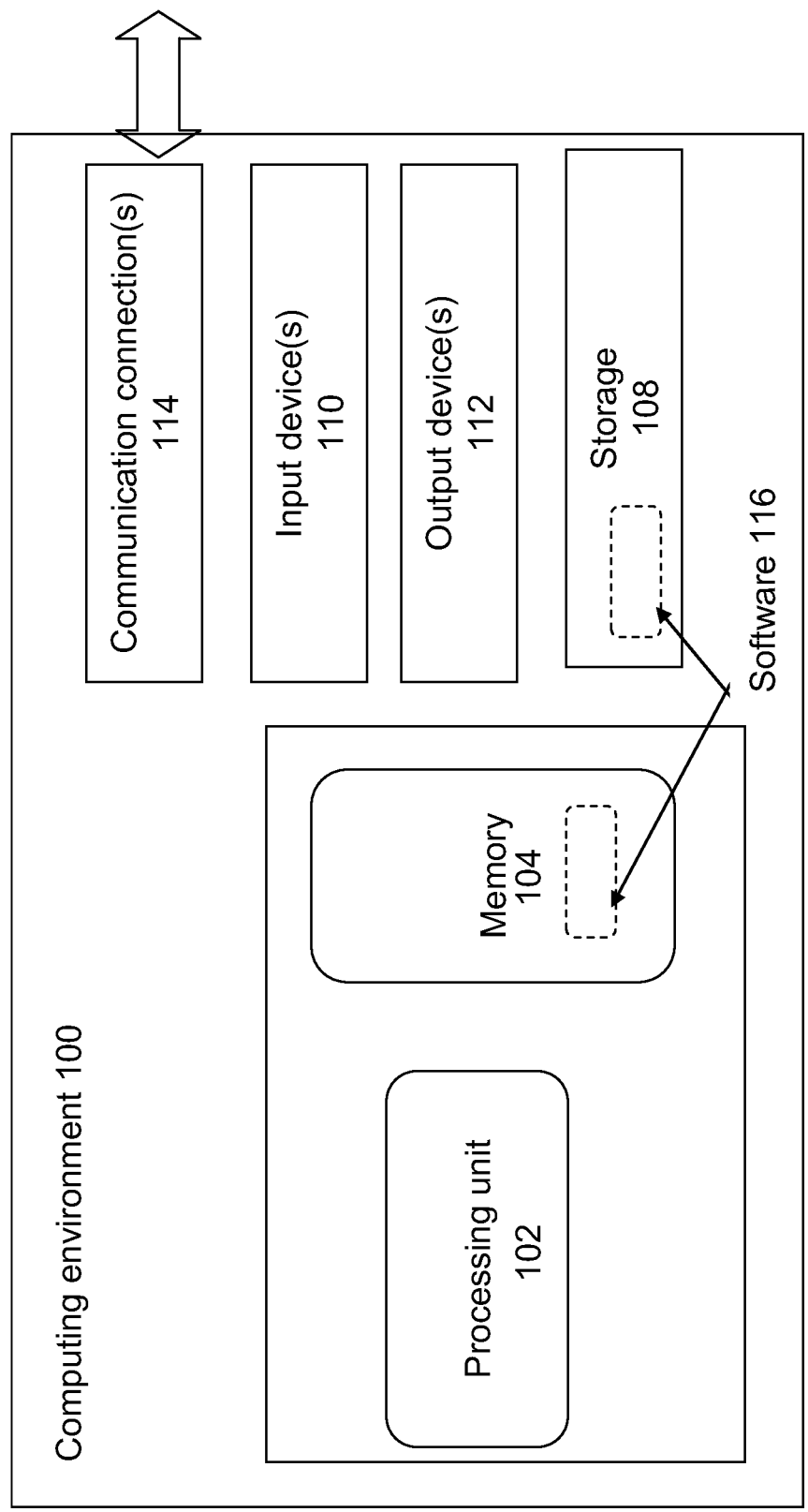
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multi-processor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can, for example, implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
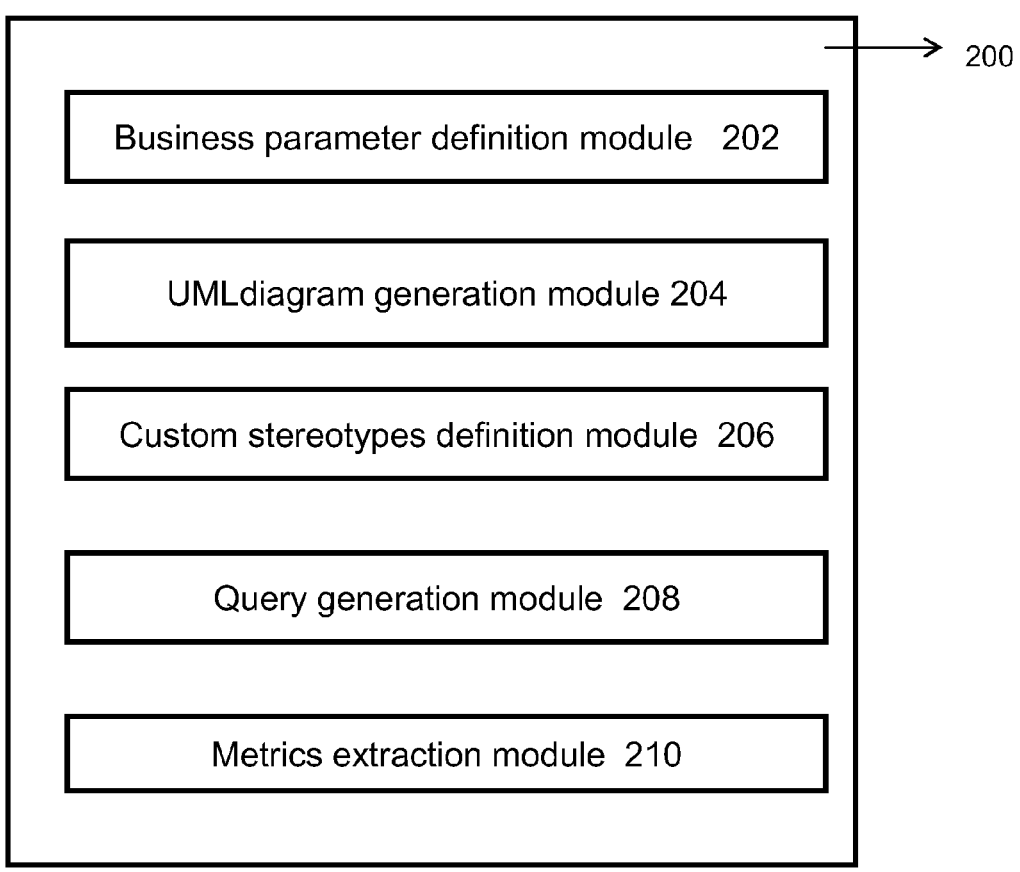
FIG. 2 is a block diagram illustrating a system for extracting at least one business process metrics from a UML model, in accordance with an embodiment of the present invention.

FIG. 2 is a block diagram illustrating a system 200 for extracting at least one business process metrics from a UML model, in accordance with an embodiment of the present invention. More particularly, in FIG. 2, system 200 includes a business parameter definition module 202, a UML diagram generation module 204, a custom stereotypes definition module 206, a query generation module 208 and a metrics extraction module 210. In various embodiments of the present disclosure, the business parameter definition module 202 is configured to define one or more measurable parameters of a business process. The one or more parameters are represented as one or more metrics name and metrics description. The UML diagram generation module 204 is configured to generate one or more UML based activity or sequence diagram representing a plurality of steps to complete the business process. The one or more UML diagrams are based on UML 2.0 or its higher version. The custom stereotypes definition module 206 is configured to define one or more custom stereotypes for one or more design elements present in the one or more measurable parameters of the business process. The one or more custom stereotypes can be used to define the maximum or minimum time required to complete one or more business process. The query generation module 208 is configured to generate one or more queries based on the one or more custom stereotypes. The example of a business process metric may include but is not limited to, identification of the number of customers for a flow, the total number of services or systems required to carry out a business process, identification of minimum and maximum time required to complete a business process and so forth.

According to an embodiment of the present invention the one or more queries are generated in OCL. The metrics extraction module 210 is configured to extract at least one metrics of the business process by running the one or more queries on the one or more UML diagrams. The extraction of the at least one metric of the business process is achieved by using one or more tools that support UML 2.0 or its higher version, custom stereotypes and OCL specification. Examples of such tools include but are not limited to Borland Together 2006, Rational Software Modeler and so forth. The one or more supporting tools have an interface to write the one or more queries specified in OCL and to run the one or more queries on the one or more UML diagrams based on UML 2.0 or its higher version. Once the at least one metric is extracted, it is compared against benchmark limits identified for the one or more measurable parameters of the business process.

Figure 3:
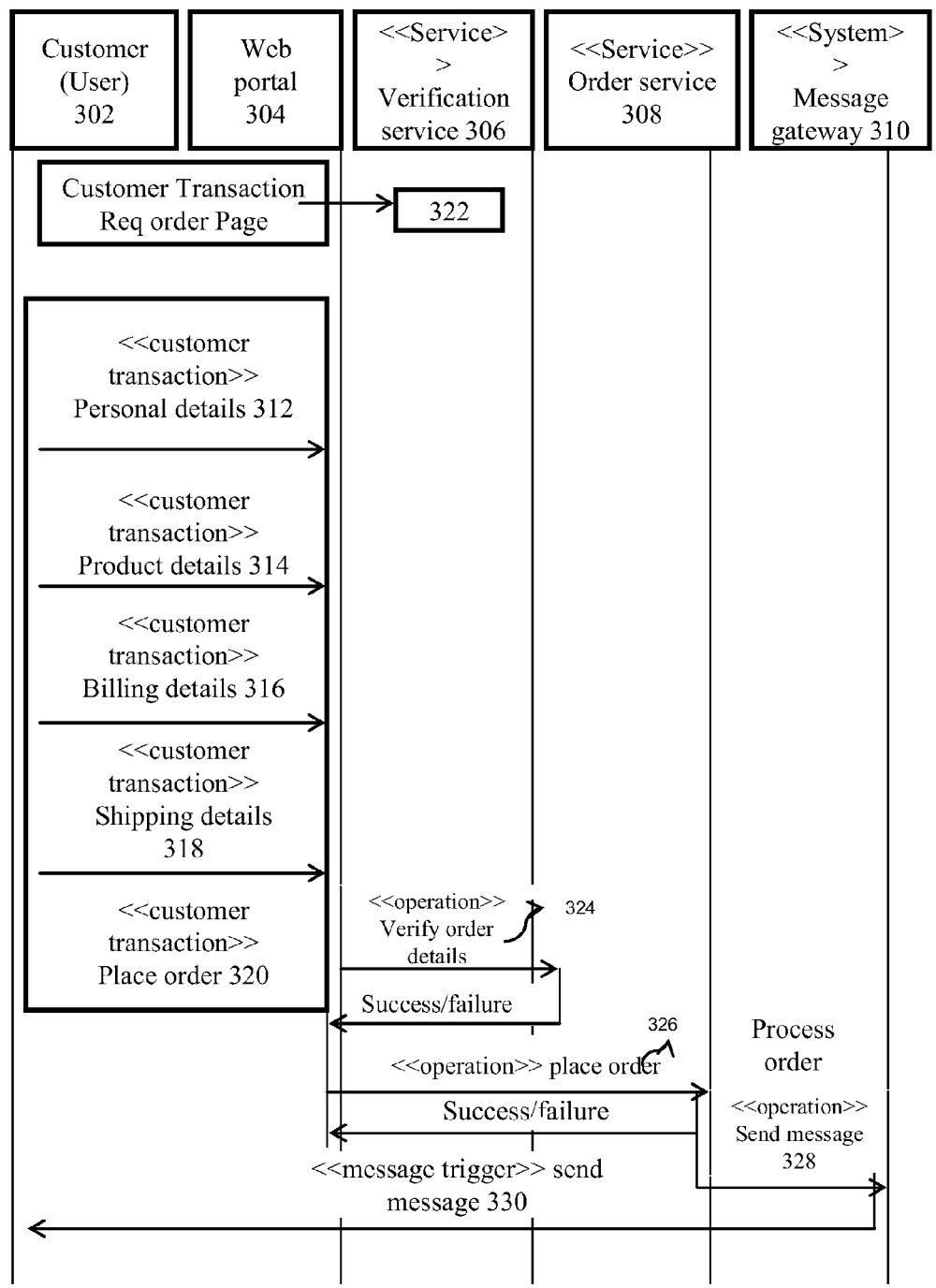
FIG. 3 is an exemplary UML diagram including a plurality of steps to complete a business process.

FIG. 3 is an exemplary UML diagram including a plurality of steps to complete a business process in which a customer (or user) 302 can request for a customer transaction page to open to place an order, at 322, through a web portal 304. The customer transaction page may include but is not limited to, personal details 312, product details 314, billing details 316, shipping details 318 and place order 320. The subsequent operation, at 324, is to verify the order details through verification service 306. After verification the next operation, at 326, is to place and process the order through order service 308. After processing the order, at 328, a message is sent to the customer (or user) 302 through a message gateway 310. A message trigger, at 330 sends message after completing every operation.

Figure 4:
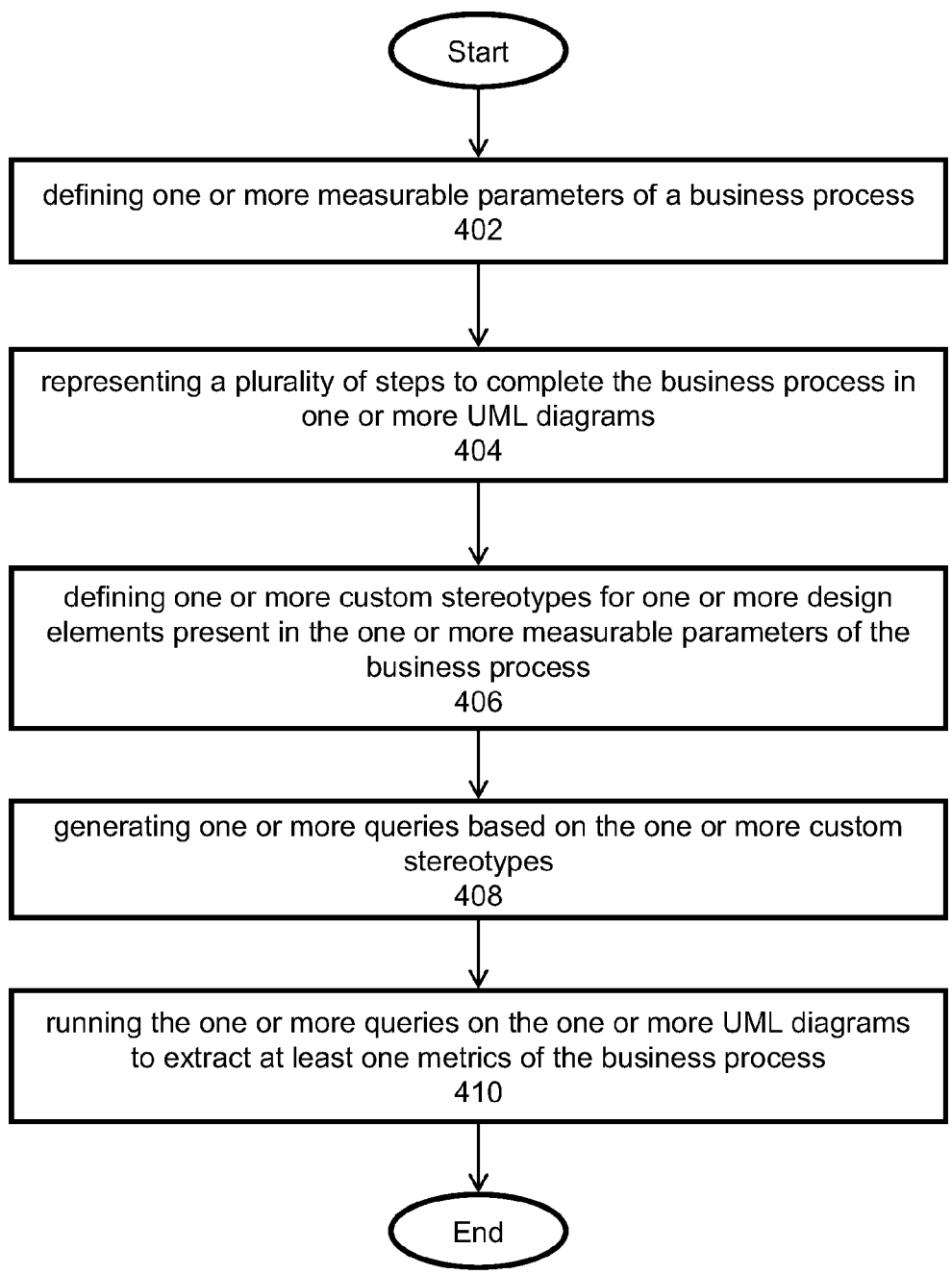
FIG. 4 is a flowchart, illustrating a method for extracting at least one business process metrics from a UML model, in accordance with an embodiment of the present invention.

FIG. 4 is a flowchart, illustrating a method for extracting at least one business process metrics from a UML model. The method includes defining one or more measurable parameters of a business process, at step 402. For example, a designer of an order capture system may be interested to measure the below one or more parameters for an order placement journey:

a. How many interactions with customer are required to complete the request?
b. How many systems or web service calls are required to complete the request?
c. How many transactions or alerts are triggered by the system to inform customer?
d. How many operations are there for a business flow?

In the above mentioned example, the one or more measurable parameters can be defined as follows:

| Metrics Name | Metrics Description |
|---|---|
| MET #1 | Number of customer transactions for a flow |
| MET #2 | Total number of services or systems required to carry out a process |
| MET #3 | Total number of alerts triggered by system during a process |
| MET #4 | Total number of web methods/operations per flow |

At step 404, a plurality of steps to complete the business process is represented in the form of one or more UML diagram. The UML diagram includes one or more activity diagrams and sequence diagrams. The one or more UML diagrams are based on UML 2.0 or its higher version. Thereafter, at 406, one or more custom stereotypes for one or more design elements present in the one or more measurable parameters of the business process are defined. The one or more custom stereotypes can be used to define the maximum or minimum time required to complete one or more web service operations. In the above mentioned example the one or more custom stereotypes can be defined as follows:

| Design element | Stereotype |
|---|---|
| Webservice | <<service>> |
| System | <<system>> |
| Customer | <<customer>> |
| Webmethod/operation | <<operation>> |
| Transaction with customer | <<customer transaction>> |
| Event to trigger message to customer | <<message trigger>> |

Further, at step 408, one or more queries are generated based on the one or more custom stereotypes. According to an embodiment of the present invention the one or more queries are based on OCL. In the above mentioned example, an exemplary OCL to identify the number of customer transaction for a flow is as follows:

```
context uml::kernel::packages::Package
inv:
ownedMembers->select(s |
s.oclIsKindOf(uml20::interaction::Interaction))
->collect(a | a.allInstances(uml20::interaction::Lifeline)
->select(c
|c.oclAsType(uml20::interaction::Lifeline).stereotypes-
>includes('customer'))
->collect(b |
```

-continued

```
b.allInstances(uml20::interaction::Int_CallMessage)))->size( )
(assuming the flow is described in a activity diagram)
context uml20::activities::Activity
inv:
allElements( )->select(m |
m.oclIsKindOf(uml20::activities::Action) and
m.oclAsType(uml20::activities::Action).stereotypes-
>includes('customer transaction'))->size( )
```

Similarly, an exemplary OCL to identify the total number of services or systems required to carry out a business process is as follows:

```
context uml::kernel::packages::Package
inv:
ownedMembers->select(s |
s.oclIsKindOf(uml20::interaction::Interaction))
->collect(a | a.allInstances(uml20::interaction::Lifeline)-
>select(c |c.oclAsType(uml20::interaction::Lifeline).stereotypes-
>includes('service')))->size( )
(assuming the flow is described in a activity diagram)
context uml20::activities::Activity
inv:
allElements( )->select(m |
m.oclIsKindOf(uml20::activities::ActivityPartition) and
m.oclAsType(uml20::activities::ActivityPartition).stereotypes-
>includes('service'))->size( )
```

Note:
Replace "service" with "system" to capture the count of systems

Similarly, an exemplary OCL to identify the total number of operations per flow is as follows:

```
context uml::kernel::packages::Package
inv:
ownedMembers->select(s |
s.oclIsKindOf(uml20::interaction::Interaction))
->collect(a | a.allInstances(uml20::interaction::Lifeline)
->select(c
|c.oclAsType(uml20::interaction::Lifeline).stereotypes-
>includes('service'))
->collect(d |d
.allInstances(uml20::interaction::ExecutionSpecification)))-
>size( )
```

Similar OCL queries can be written to calculate the minimum or maximum time required to complete a process. Referring back to FIG. 4, at step 410, the one or more queries are run on the one or more UML diagrams to extract at least one metric of the business process. The extraction of the at least one metric of the business process is achieved by using one or more tools that support UML 2.0 or its higher version, custom stereotypes and OCL specification. Examples of the one or more supporting tools used to extract the at least one metrics of the business process include but are not limited to Borland Together 2006, Rational Software Modeler and so forth. The one or more supporting tools have an interface to write the one or more queries specified in OCL and to run the one or more queries on the one or more UML diagrams based on UML 2.0 or its higher version.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

I claim:

1. A computer-implemented method executed by one or more computing devices for extracting at least one business process metric from a modeling language diagram comprising:
    generating, by at least one of the one or more computing devices, a modeling language diagram corresponding to a business process;
    identifying, by at least one of the one or more computing devices, one or more design elements in the modeling language diagram, wherein the one or more design elements are relevant to one or more business process metrics;
    defining, by at least one of the one or more computing devices, one or more custom stereotypes corresponding to the one or more design elements in the modeling language diagram;
    generating, by at least one of the one or more computing devices, an object constraint language (OCL) query including at least one custom stereotype of the one or more custom stereotypes, wherein the OCL query is configured to compute a business process metric in the one or more business process metrics by identifying one or more occurrences of the at least one custom stereotype in a process flow corresponding to the modeling language diagram; and
    running, by at least one of the one or more computing devices, the OCL query on the modeling language diagram to compute the business process metric.

2. The computer implemented method as claimed in claim 1, wherein the business process metric includes a metric name and a metric description.

3. The computer implemented method as claimed in claim 1, wherein the business process metric comprises one of a number of customer transactions for the process flow, a total number of services or systems required to carry out the business process, a total number of alerts triggered by a system during the business process, and a total number of web methods or operations for the process flow.

4. The computer implemented method as claimed in claim 1, wherein the modeling language diagram comprises one of an activity diagram and a sequence diagram.

5. The computer implemented method as claimed in claim 1, wherein the business process metric comprises one of a maximum time and a minimum time to complete the business process.

6. The computer implemented method as claimed in claim 1, wherein the OCL query is run using a tool that that supports the modeling language diagram, custom stereotypes, and an OCL specification.

7. The computer implemented method as claimed in claim 6, wherein the tool includes an interface to write the OCL query and to run the OCL query on the modeling language diagram.

8. An apparatus for extracting at least one business process metric from a modeling language diagram, the system comprising:
    one or more processors; and
    one or more memories operatively coupled to at least one of the one or more processors and having instructions stored thereon that, when executed by at least one of the one or more processors, cause at least one of the one or more processors to:
    generate a modeling language diagram corresponding to a business process;
    identify one or more design elements in the modeling language diagram, wherein the one or more design elements are relevant to one or more business process metrics;
    define one or more custom stereotypes corresponding to the one or more design elements in the modeling language diagram;
    generate an object constraint language (OCL) query including at least one custom stereotype of the one or more custom stereotypes, wherein the OCL query is configured to compute a business process metric in the one or more business process metrics by identifying one or more occurrences of the at least one custom stereotype in a process flow corresponding to the modeling language diagram; and
    run the OCL query on the modeling language diagram to compute the business process metric.

9. The apparatus of claim 8, wherein the business process metric includes a metric name and a metric description.

10. The apparatus of claim 8, wherein the business process metric comprises one of a number of customer transactions for the process flow, a total number of services or systems required to carry out the business process, a total number of alerts triggered by a system during the business process, and a total number of web methods or operations for the process flow.

11. The apparatus of claim 8, wherein the modeling language diagram comprises one of an activity diagram and a sequence diagram.

12. The apparatus of claim 8, wherein the business process metric comprises one of a maximum time and a minimum time to complete the business process.

13. The apparatus of claim 8, wherein the OCL query is run using a tool that that supports the modeling language diagram, custom stereotypes, and an OCL specification.

14. The apparatus of claim 13, wherein the tool includes an interface to write the OCL query and to run the OCL query on the modeling language diagram.

15. At least one non-transitory computer-readable medium storing computer-readable instructions that, when executed by one or more computing devices, cause at least one of the one or more computing devices to:
    generate a modeling language diagram corresponding to a business process;
    identify one or more design elements in the modeling language diagram, wherein the one or more design elements are relevant to one or more business process metrics;
    define one or more custom stereotypes corresponding to the one or more design elements in the modeling language diagram;
    generate an object constraint language (OCL) query including at least one custom stereotype of the one or more custom stereotypes, wherein the OCL query is configured to compute a business process metric in the one or more business process metrics by identifying one or more occurrences of the at least one custom stereotype in a process flow corresponding to the modeling language diagram; and
    run the OCL query on the modeling language diagram to compute the business process metric.

16. The at least one non-transitory computer-readable medium of claim 15, wherein the business process metric comprises one of a number of customer transactions for the process flow, a total number of services or systems required to carry out the business process, a total number of alerts triggered by a system during the business process, and a total number of web methods or operations for the process flow.

17. The at least one non-transitory computer-readable medium of claim 15, wherein the modeling language diagram comprises one of an activity diagram and a sequence diagram.

18. The at least one non-transitory computer-readable medium of claim 15, wherein the business process metric comprises one of a maximum time and a minimum time to complete the business process.

19. The at least one non-transitory computer-readable medium of claim 15, wherein the OCL query is run using a tool that that supports the modeling language diagram, custom stereotypes, and an OCL specification.

20. The at least one non-transitory computer-readable medium of claim 19, wherein the tool includes an interface to write the OCL query and to run the OCL query on the modeling language diagram.

\* \* \* \* \*